(12) United States Patent
Blendinger et al.

(10) Patent No.: US 9,350,054 B2
(45) Date of Patent: May 24, 2016

(54) ELECTRIC ENERGY STORE

(75) Inventors: Stefan Blendinger, Furth (DE); Marc Hanebuth, Nuremberg (DE); Sylvio Kosse, Erlangen (DE); Uwe Lenk, Zwickau (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 119 days.

(21) Appl. No.: 14/125,130

(22) PCT Filed: May 30, 2012

(86) PCT No.: PCT/EP2012/060157
§ 371 (c)(1),
(2), (4) Date: Dec. 10, 2013

(87) PCT Pub. No.: WO2012/171796
PCT Pub. Date: Dec. 20, 2012

(65) Prior Publication Data
US 2014/0134505 A1     May 15, 2014

(30) Foreign Application Priority Data

Jun. 17, 2011  (DE) .......................... 10 2011 077 695

(51) Int. Cl.
| | |
|---|---|
| *H01M 10/61* | (2014.01) |
| *H01M 10/659* | (2014.01) |
| *H01M 10/6561* | (2014.01) |
| *H01M 8/04* | (2006.01) |
| *H01M 12/08* | (2006.01) |

(52) U.S. Cl.
CPC ...... *H01M 10/5089* (2013.01); *H01M 8/04074* (2013.01); *H01M 10/659* (2015.04); *H01M 12/08* (2013.01); *Y02E 60/50* (2013.01)

(58) Field of Classification Search
CPC .. H01M 10/60–10/6561; H01M 8/00–8/04992
USPC ........................................... 165/10, 144, 145
See application file for complete search history.

(56) References Cited

U.S. PATENT DOCUMENTS

| | | | |
|---|---|---|---|
| 3,848,664 A * | 11/1974 | Perry ...................... | F25B 29/00 165/218 |
| 4,007,315 A * | 2/1977 | Brinkmann et al. ............ | 429/62 |
| 4,329,407 A | 5/1982 | Birnbreier | |
| 2006/0172176 A1* | 8/2006 | MacBain .......... | H01M 8/04007 429/415 |

(Continued)

FOREIGN PATENT DOCUMENTS

| | | |
|---|---|---|
| EP | 1798488 A2 | 6/2007 |
| EP | 1953858 A1 | 8/2008 |

(Continued)

OTHER PUBLICATIONS

Machine translation of Yamazaki et al. JP 07-226228 (Aug. 1995).*

*Primary Examiner* — Jonathan Crepeau
*Assistant Examiner* — Jacob Buchanan
(74) *Attorney, Agent, or Firm* — Beusse Wolter Sanks & Maire

(57) ABSTRACT

An electric energy store having a thermally insulated chamber that has a process gas inlet and a process gas outlet is provided. The thermally insulated chamber is equipped with at least two stacks, each of which has at least one electrochemical storing cell, and each stack has a process gas inlet and a process gas outlet. The at least two stacks are serially connected with respect to the process gas flow.

10 Claims, 4 Drawing Sheets

(56) References Cited

U.S. PATENT DOCUMENTS

| | | | | |
|---|---|---|---|---|
| 2007/0172725 A1* | 7/2007 | Doshi | ................ | H01M 6/5038 429/120 |
| 2008/0236181 A1* | 10/2008 | Zhu et al. | ........................ | 62/239 |
| 2009/0123815 A1* | 5/2009 | Alkemade et al. | .............. | 429/50 |
| 2010/0136406 A1* | 6/2010 | Song et al. | .................... | 429/120 |

FOREIGN PATENT DOCUMENTS

| | | | | |
|---|---|---|---|---|
| EP | 2254182 A1 | 11/2010 | | |
| JP | 07226228 A | * | 8/1995 | ............ H01M 10/39 |
| WO | 2008099575 A1 | 8/2008 | | |

\* cited by examiner

ELECTRIC ENERGY STORE

CROSS REFERENCE TO RELATED APPLICATIONS

This application is the US National Stage of International Application No. PCT/EP2012/060157 filed May 30, 2012, and claims the benefit thereof. The International Application claims the benefit of German Application No. DE 102011077695.8 filed Jun. 17, 2011. All of the applications are incorporated by reference herein in their entirety.

FIELD OF INVENTION

The invention relates to an electric energy store.

BACKGROUND OF INVENTION

One concept of an electric energy store provides for using a metal in conjunction with an air electrode. What may be used as an oxygen-conducting solid electrolyte is, for example, yttrium- or scandium-stabilized zirconium dioxide. These electrolytes exhibit highly selective oxygen conduction, but require relatively high operating temperatures of typically more than 600° C.

Since air is required at least temporarily for operating an air battery and also has to be brought to a minimum temperature, the aim is to keep the mass flow of air as low as possible and offer only as much air as is actually needed for the electrochemical reaction. Heat losses which would inevitably occur because of the discharge of the hot exhaust gas into the environment can thereby be minimized. Only some of the heat from the exhaust gas stream can ever be recovered efficiently.

The constantly occurring temperature gradients which lead to thermal stresses present a technical challenge in high temperature air batteries. Depending on their type of construction, therefore, the temperature gradients should not overshoot a critical value, so as not to damage the stack (as a rule, a stack of several individual cells). In addition to thermal stress, however, the absolute temperature may also have a limiting effect. Calculations have shown that the temperature of the gas stream may rise above a value of 1000° C., theoretically even above 1500° C., if a correspondingly low air stream is selected. Such high temperatures are undesirable because there are no cost-effective materials for such temperatures and also major heat losses through the insulation would occur.

A further technical challenge arises from the fact that the batteries often have to dwell in standby mode. The batteries often in this case have to fulfill the requirement that they must become operative within a few minutes and in this case give virtually maximum power in the shortest possible time. For this reason, the battery should not cool in standby mode and should be maintained constantly at the approximate operating temperature.

SUMMARY OF INVENTION

An object of the invention is, in particular, to provide an electric energy store of the type described above, in which the temperature gradient between individual stacks is minimized.

The electric energy store herein has a thermally insulated space which has in turn a process gas inlet and a process gas outlet. At least two stacks are arranged in this insulated space and in each case comprise in turn at least one electrochemical cell, each stack having in turn a process gas inlet and a process gas outlet. As described herein, at least two stacks are connected in series with respect to the routing of the process gas.

It became apparent, surprisingly, that a series connection of the stacks, which means that a process gas outlet of a first stack simultaneously forms the process gas inlet of a second stack, causes no appreciable losses of efficiency in the case of a lower temperature gradient. The pressure losses in the process gas line which are brought about by the series connection do not lead to a significantly lower power output of the series-connected stacks.

In a further expedient embodiment of the invention, a heat exchanger is also arranged between a first stack and the second stack which are connected in series. This heat exchanger has the effect that the process gas which emerges from the stack, particularly during the discharge process, has an increased temperature, is cooled again and flows into the second stack at an only slightly increased temperature.

In this case, moreover, it is expedient that the heat exchanger is in thermal contact with a heat store which in turn stores the heat and, during the typically endothermal charging process of the battery, makes thermal energy available to the process gas again and heats it.

It is especially advantageous, furthermore, if an inlet heat exchanger is provided, which is provided between the process gas feed of the insulated space and the first stack, this inlet heat exchanger being in turn in thermal contact with the heat store. By means of the inlet heat exchanger, the process gas, which, although being preheated outside the insulated space, does not yet have the final process temperature, can be raised to a desired process temperature. In this case, it is advantageous if the inlet heat exchanger is in thermal contact with the heat store and therefore with a plurality of heat exchangers which are arranged in series behind the first stack. Thus, the heat energy which the process gas has given off via the heat exchanger after running through the first stack is transmitted to the inlet heat exchanger, with the result that this waste heat can be utilized in order to preheat the process gas which flows into the insulated space.

A latent heat store, as it is known, has proved to be an expedient type of construction for a heat store of this type.

A latent heat store is designed such that it has a material which has especially high heat absorbency due to phase transition from solid to liquid in the selected temperature range on account of melt enthalpy.

In this case, it is expedient to select a phase transformation temperature of the storage material of the latent heat store such that it lies above a process gas inlet temperature and below a process gas outlet temperature of the process gas upon respective entry into and exit from the insulated space. It is thereby possible to operate the heat exchanger efficiently in a small construction space.

It is likewise expedient to equip the heat store with a heating element which contributes to preheating the electric energy store in what is known as the startup phase during a cold start.

It is likewise expedient, in addition to the already mentioned series connection of stacks, to arrange one or more further series connections of at least two stacks. Heat exchangers of each series connection should in this case be in thermal contact with a heat store. In this case, all the heat exchangers of an electric energy store, that is to say of an insulated space of an electric energy store, may be in thermal contact with a single heat store, but a separate heat store may also be provided in each case for each series connection.

In this case, it is expedient that the inlet heat exchanger is arranged in the heat store such that said inlet heat exchanger is surrounded by further heat exchangers of the series-connected stacks, so that the transition of heat to it is as high as possible and the process gas can thereby be preheated optimally.

For better management of the temperature of the reaction gas, it may be expedient, in turn, that the heat store which is arranged in the insulated space is in turn insulated thermally with respect to the latter.

BRIEF DESCRIPTION OF THE DRAWINGS

Further embodiments and further features of the invention are explained in more detail by means of the following figures. These figures do not in themselves constitute any restriction of the scope of protection since these are merely exemplary embodiments.

In the figures.

DETAILED DESCRIPTION OF INVENTION

Figure 8:
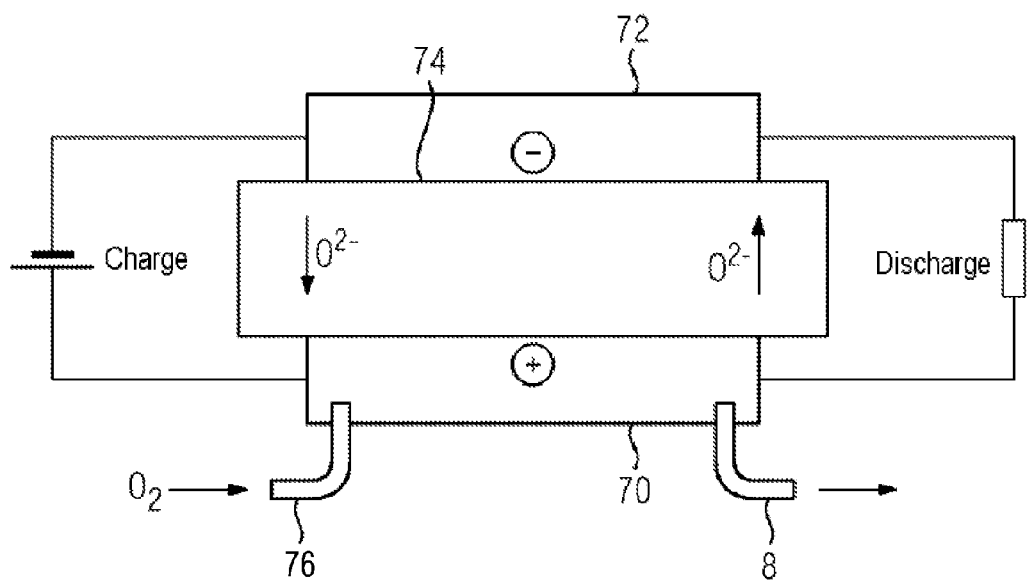
FIG. 8 shows a diagrammatic illustration of the type of operation of an ROB.

The type of operation of a rechargeable oxide battery (ROB) or of an electrochemical cell used therein will be described roughly by means of FIG. 8, in so far as it is necessary for the following description of the invention. In a conventional set-up of an ROB, a process gas, in particular air, is fed to a positive electrode 70 via a process gas feed 76, oxygen being extracted from the air or being given off to the air, depending on the operating state, and passing in the form of oxygen ions ($O^{2-}$) through a solid electrolyte 74 to a negative electrode 72 or a positive electrode 70.

At the negative electrode, depending on the operating state, it is discharged or charged, oxidized or reduced. If, then, a solid layer of the material to be oxidized or to be reduced (for example, ion, manganese or nickel is used for this purpose) were present on the negative electrode, the charging capacity of the battery would quickly be exhausted. For this reason, it is expedient to use for a negative electrode an energy storage medium in the form of a porous body which contains the functionally acting oxidizable material, that is to say the metal in expedient form.

Via a redox pair, for example $H_2/H_2O$, which is gaseous in the operating state of the battery, the oxygen is transported through the pore channels of the porous body to the oxidizable material, that is to say the metal. Depending on whether a charging or a discharging operation is taking place, the metal or metal oxide is oxidized or reduced and the oxygen required for this purpose is delivered or transported back to the solid electrolyte 74 by the gaseous redox pair $H_2/H_2O$. This mechanism is also designated as a shuttle mechanism.

Figure 1:
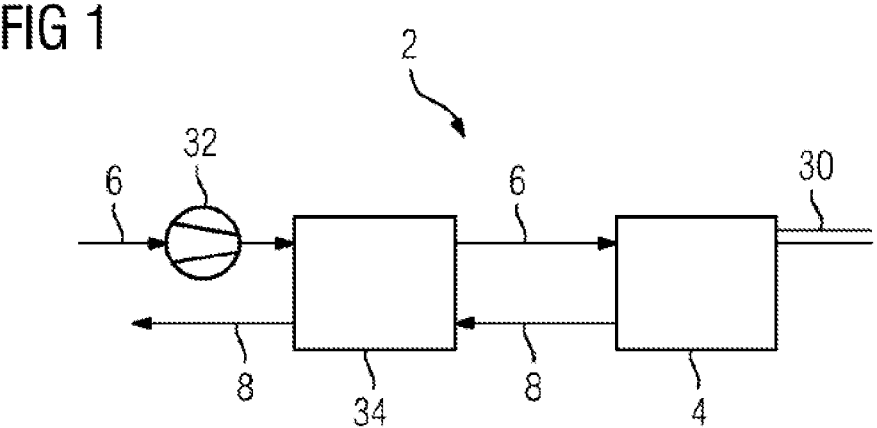
FIG. 1 shows a diagrammatic illustration of an electric energy store with an insulated space and with a heat exchanger connected in front of it.

The set-up of an electric energy store in the form of an ROB is illustrated purely diagrammatically in box form in FIG. 1. It comprises as a component a thermally insulated space 4 which, on the one hand, has a process gas inlet 6 and a process gas outlet 8. The process gas inlet 6 and the process gas outlet 8 are in turn led with respect to one another in a heat exchanger 34 such that the hotter gas in the process gas outlet transmits a part of its thermal energy to the colder gas in a preceding heat exchanger 34. To provide the required flow pressure of the process gas, a blower 32 is also connected upstream of the heat exchanger 34.

Figure 2:
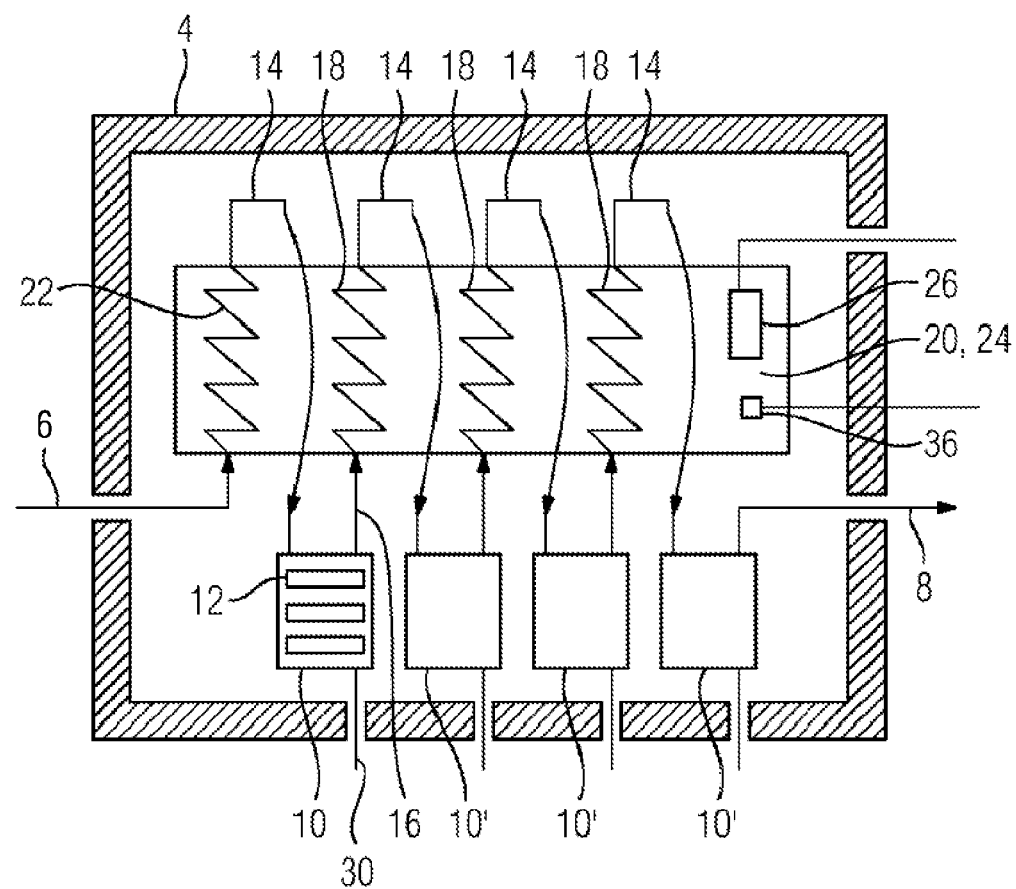
FIG. 2 shows an enlarged illustration of the insulated space of an electric energy store.

Furthermore, in particular, the arrangement of the individual components in the thermally insulated space 4 is dealt with. For this purpose, FIG. 2 illustrates an enlarged illustration of the insulated space 4 which among specialists is also designated as a hot box.

First of all, the insulated space 4 has the process gas inlet 6 and the process gas outlet 8 which have already been described with regard to FIG. 1. In the insulated space 4, then, a plurality of stacks 10 and 10', as they are known, are arranged. Each of the stacks 10, 10' in turn contains at least one, but usually a plurality of electrochemical cells 12 (cf. the description relating to FIG. 8), the type of operation of which will not be dealt with at this juncture. It should be noted that each stack distributes in turn the inflowing process gas to the individual storage cells 12 by means of what is known as a manifold, the process gas flowing through each individual electrochemical cell 12, as a result of which, in turn, the electrochemical reaction described is set in motion and leads to the storage of electric energy or to the giving off of electric energy. The electric energy is fed or diverted by means of the electrical feed and diversion lines 30.

The individual stacks 10 and 10' in the insulated space 4 are distinguished in that they are connected in series with respect to their process gas inlet 14 and their process gas outlet 16. This means that the process gas outlet 16 of the stack 10 constitutes in turn the process gas inlet 14 of the stack 10'. In this case, it is expedient to connect as many stacks as possible in series, and it became apparent that a number of eight stacks connected in series should not be overshot for thermal reasons, since the positive properties of the thermal routing of the process gas no longer occur to an advantageous extent if there are more than eight stacks.

An inlet heat exchanger 22 is provided between the process gas inlet 6 into the insulated space 4 and process gas inlet 14 into the first stack 10. After the emergence of the process gas from the first stack 10, that is to say the process gas outlet 16 of the stack 10, and from the process gas inlet 14 of the second stack 10', a further heat exchanger 18 is arranged in turn.

A heat store 20 is likewise arranged in a similar way between the further series-connected stack 10'. Both the inlet heat exchanger 22 and the further heat exchangers 18 are in thermal contact with a heat store 20 which is configured in the form of a latent heat store 24. The type of the operation of the heat store will also be dealt with below. The inlet heat exchanger 22, which on one side is connected directly to the insulated space 4 as well as to the process gas inlet 6, is thus connected upstream of the first stack 10 and is in thermal contact with the other heat exchangers 18. According to FIG. 7, the process gas which passes through the line 6 into the insulated space 4 is colder than the process gas which has already run through one or more stacks (cf. FIG. 7 which shows diagrammatically the process gas temperature for a charging and a discharging operation upon entry into and exit from the insulated space and between the individual stacks). Since the inlet heat exchanger 22 is in close thermal contact with the other heat exchangers 18, the incoming process gas, even before it enters the first stack 10, is raised to a temperature which corresponds essentially to an average temperature which prevails between the individual stacks 10, 10' (cf. FIG. 7).

Furthermore, in the heat store 20, 24, a heating element 26 is provided which is preferably coupled to a temperature sensor 36, with the result that the heat content of the heat store 20, 24 can be checked or can be influenced. In particular, for a cold start of the electric energy store 2, the heat store 20, 24 can be preheated so that the electric energy store is ready for use as quickly as possible (startup).

Particularly for what is known as a standby time, in which neither electric energy is introduced into the energy store 2 nor electric energy is drawn off, the electric energy store 2 has to be ready for use within a short time.

For this purpose, it became apparent that the heat store 20, 24, which is arranged in the thermally insulated space 4 and, if appropriate, may in turn also be insulated with respect to the latter, is highly suitable for bringing the energy store into the corresponding charging or discharging mode in the shortest possible time.

The functioning of a latent heat store 24 will also be dealt with. The material which has proved expedient for a latent heat store 24 is a salt body in the form of sodium chloride or calcium chloride, if possible in its purest form. The advantage of using a pure substance is that it has a constant melting point and the operating temperature can be kept within a small temperature window of less than 20%. Alternatively, another pure substance or a eutectic mixture, which should likewise have a constant melting point made in a suitable temperature range, may also be used. Excess heat in electric stores based on air, typically in the discharge mode, is intermediately stored as fusion heat and is recovered at a later time, that is to say in standby or charging mode, in the form of solidification heat.

Figure 7:
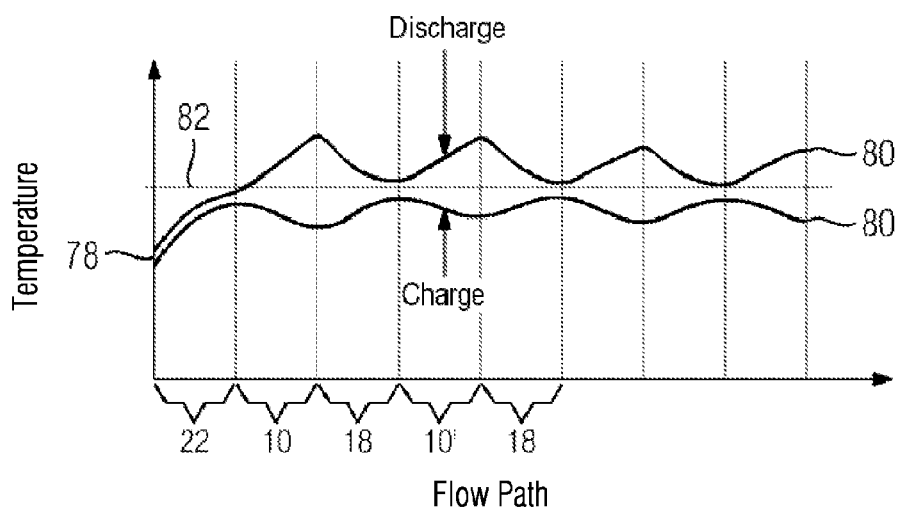
FIG. 7 shows a diagrammatic temperature profile of a process gas which runs alternately through latent heat stores and stacks.

In the latent heat stores, a closed form is expedient, and if appropriate pressure equalization caused by the change in volume of the material should be ensured. It is in this case expedient to keep in reserve a buffer volume which allows a change in volume occurring during the phase transition of the heat store or during the heating or cooling period, without the container of the latent heat store being damaged. A sensor or a plurality of sensors 36 for checking the state of the latent heat store 24, which serve, for example, as temperature sensors or for determining the electrical or thermal conductivity, should be located in the latent heat store. FIG. 7 indicates a phase transformation temperature of the latent heat store which lies above the air inlet temperature and below the maximum orienting temperature of the system.

Figure 3:
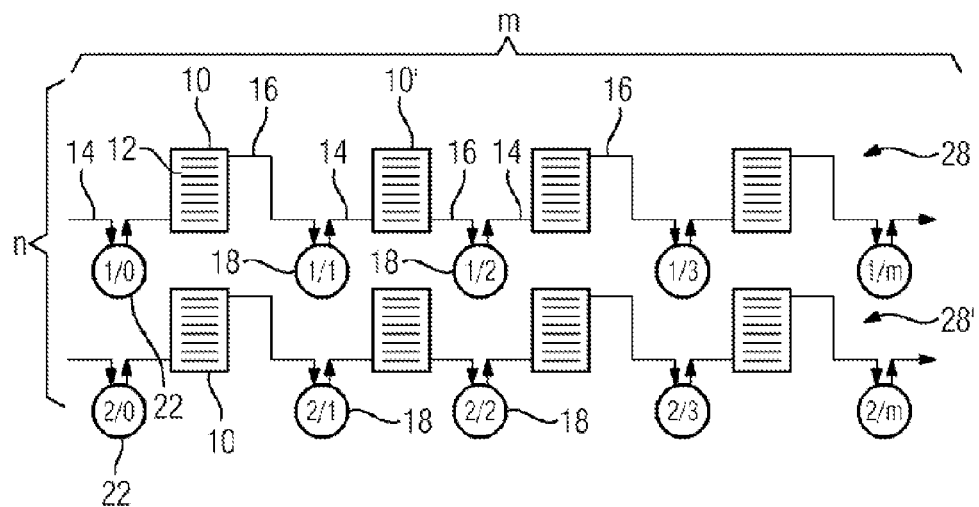
FIG. 3 shows a diagrammatic illustration of the series connection of a plurality of stacks.
Figure 4:
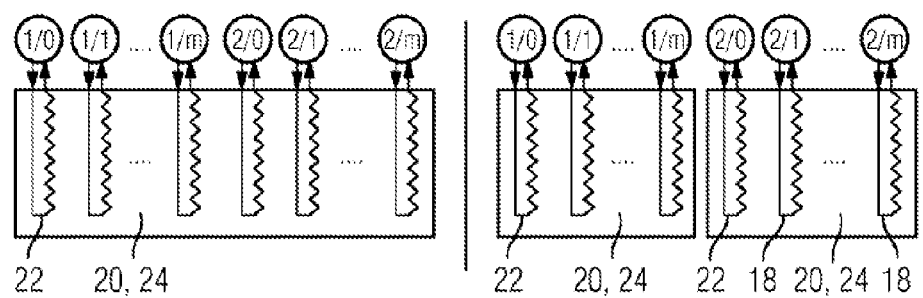
FIG. 4 shows the diagrammatic arrangement of the heat exchangers, illustrated in FIG. 3, in a heat store.
Figure 5:
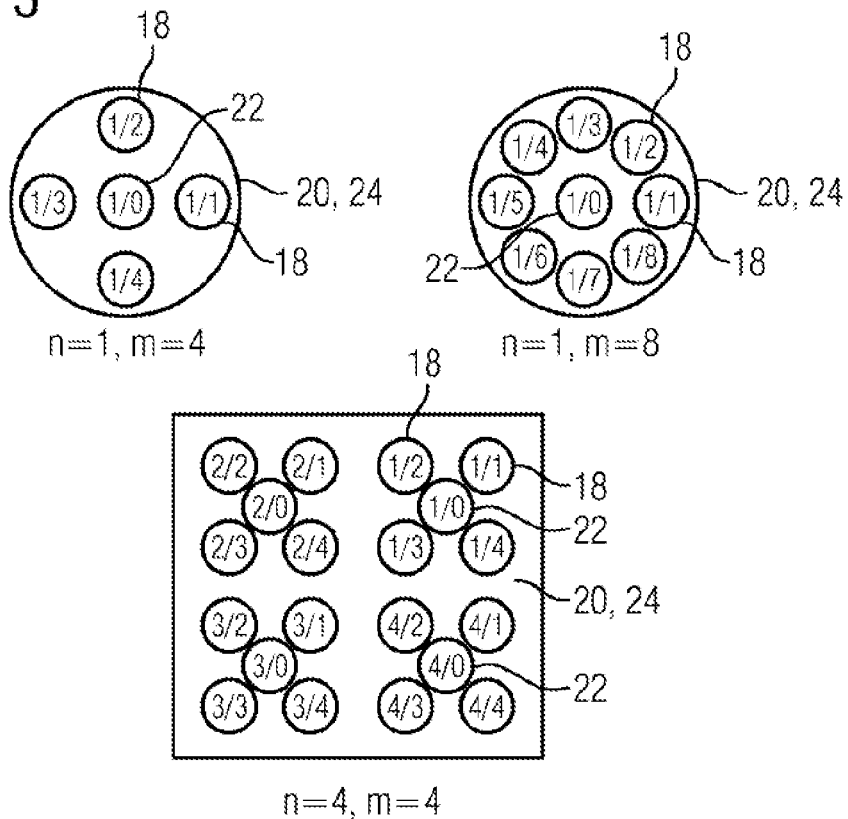
FIG. 5 shows the arrangement of the heat exchangers from FIG. 3 in a heat store as a top view.

FIGS. 3 to 5 illustrate diagrammatically expedient arrangements of the stacks and of the heat exchangers or of the heat exchangers with respect to the heat store. FIG. 3 illustrates first, in the upper region, a series connection 28 of a plurality of stacks 10 and 10' which have in each case a process gas inlet 14 and a process gas outlet 16, the process gas outlet 16 of the stack 10 forming in turn a process gas inlet 14 of the following stack 10'. Between the process gas outlet 16 and the process gas inlet 14 is arranged a heat exchanger 18 which bears the designation 1/1 in FIG. 3. This nomenclature will also be dealt with. Furthermore, the inlet heat exchanger 22, which bears the designation 1/0, is arranged in front of the stack 10. This is therefore, in the upper region, the first series connection 28, and below it a second series connection 28' is illustrated. The series connections 28 and 28' and, if appropriate, also following series connections 28' which are not illustrated, are connected in parallel with respect to the process gas inlet 6 into and the process gas outlet 8 out of the thermally insulated space 4.

In FIG. 3, the series connections 28 and 28' are designated by a small n according to the curly bracket illustrated vertically in front of them. The individual stacks, which are connected in series in each series connection 28, are designated by a small m. The heat exchangers which are arranged in front of the stack 10 (inlet heat exchanger 22) and between the stacks 10, 10' (heat exchanger 18) have in their designation, as the first digit, the place marker n, that is to say the numbering of the respective series connection 28, and behind the stroke, as the second digit m, their position within the respective series connection 28, 28'. The inlet heat exchanger 22 therefore always acquires the digit 0 as a second digit, since it is arranged in front of the first stack 10. The heat exchanger 18 behind the first stack always acquires the digit 1 in each series connection 28, and then the digit 2, 3, etc.

In the series connection 28', the digit 2 is in first place, the inlet heat exchanger 22 of the series connection 28' therefore having as first digit a digit 2, after the stroke the digit 0, etc. Thus, in each energy store, any number of, that is to say n series connections 28 or 28' can be connected in parallel to theoretically any number of, that is to say m series-connected stacks 10, 10'.

In this case, all the heat exchangers 22, 18 may be in direct thermal contact with a single heat store 20, 24. This is illustrated in FIG. 4, left side. In principle, however, as is illustrated in FIG. 4, right side, overall n heat stores 20, 24 may also be used for each series 28, 28'.

FIG. 5 gives a top view of the heat exchangers 18, 22 arranged in the heat stores 20, 24. Illustrated here at top left is a heat store 20, 24 which contains only one row 28 of stacks 10, 10' connected in series, wherein m=4, that is to say four stacks 10, 10' connected in series being provided. The inlet heat exchanger 22 is in this case arranged as far as possible centrally between the other heat exchangers 18 so that it acquires as high a temperature as possible. It is therefore arranged centrally in the heat store 20, 24 with respect to the other heat exchangers 18. A similar illustration is given at top right in FIG. 5, where the inlet heat exchanger 22 (1/0) is in each case in turn surrounded by the other heat exchangers 18. These are illustrations which correspond to FIG. 4, right side, each row 28 or 28' having its own heat store 20, 24 to which all the heat exchangers 18, 22 of the row 28 are assigned.

In principle, it is also possible, as illustrated in FIG. 5, lower part, in the rectangular box, that all the heat exchangers of any row 28, 28' are arranged in a heat store 20, 24. In this case, the number of individual rows 28, 28' is given as m=4, each row 28, 28' having in turn four stacks 10, 10', between which a heat exchanger 18 is arranged in each case, the heat exchangers 18 of any row 28, 28' in turn surrounding their inlet heat exchanger 22.

Figure 6:
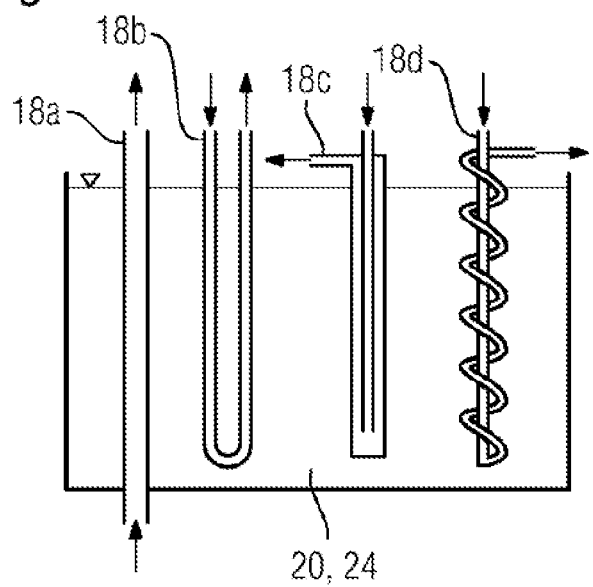
FIG. 6 shows various embodiments of heat exchangers.

FIG. 6 illustrates by way of example four possible illustrations of a heat exchanger 18 which are in each case identified by an additional small letter a to d. The heat exchanger 18a is a simple version of a heat exchanger which can be implemented in a technically simple way, but requires a higher outlay in terms of sealing technology with regard to leak tightness and to the thermal expansions or contractions occurring in the heat store. This outlay is not necessary in the heat exchanger 18b having a somewhat more complicated configuration in the form of a U-tube. Further advantageous embodiments are in the form of the heat exchanger 18c which is configured in a similar way to what is known as a wash bottle, such as is customary in chemical laboratories. The heat exchanger with a conventional helical form, as illustrated by the heat exchanger 18d, may likewise be expedient.

It is especially advantageous if, with the exception of the inlet heat exchanger 22, in each case the same form of construction is used for the heat exchangers. The central heat exchanger 22 should be designed differently only when sufficient heat transport in the heat storage medium or heat transition at the heat exchanger itself cannot otherwise be ensured. The flow passes through the inlet heat exchanger of each series connection 28 in the direction which is illustrated in FIG. 6. In the form of construction of the heat exchanger 18a, this is from the bottom upward with respect to FIG. 6. The result of this is that, in all operating states, a solid phase, that is to say a crystal nucleus, is obtained for the latent heat store in the lower region of the central heat exchanger. Crystal growth therefore takes place primarily from the bottom upward, that is to say counter to gravity, so that the overlying liquid phase in the latent heat store is displaced upward into the buffer volume (not illustrated graphically) provided for this purpose, without additional mechanical stresses being generated.

The outer tubes of the heat exchangers, that is to say of the heat exchangers 18 in FIG. 5, may have the flow passing through them in any direction or possibly even, advantageously, in the opposite direction to the inlet heat exchanger 22 which is arranged centrally. It is also possible that the heat exchangers 18 which are arranged around the inlet heat exchanger 22 have the flow passing through them alternately in opposite directions.

In principle, it should also be noted that the heat exchanger 18 following a last series-connected stack 10 is optional, its use depending on the temperature which, depending on the type of construction, prevails downstream of the last stack 10.

The inlet heat exchanger 22 of each row 28 preheats the inflowing gas and is therefore arranged centrally. It is surrounded by the other heat exchangers 18 of the same row 28. Since the gas temperature lies below the phase transformation temperature of the heat storage medium of the latent heat store 24 in any operating state, the region of the central heat exchanger is suitable for keeping crystal nuclei in reserve in the form of a solid phase.

The already described sensors in the heat store 20, 24 also serve, in particular, for detecting phase transition at exactly this point. These may be a temperature sensor or a sensor for electrical conductivity or heat conductivity. This is expediently located in the lower region in the vicinity of the central heat exchanger, that is to say of the inlet heat exchanger 22. Alternatively, one or more temperature sensors may be introduced within the gas stream of the inlet heat exchanger 22. In addition, sensors may be placed at further points within the gas stream or store.

Furthermore, technical challenges arise with liquid/solid phase transformation when latent heat stores are used:

Phase transition from liquid to solid causes an increase in volume in most cases. Care must therefore always be taken to ensure that an appropriate phase transformation volume, into which the storage medium can expand, as required, is ready. Damage caused by mechanical stresses is thereby avoided.

In order to keep the battery system as simple as possible, it is desirable to preserve for each operating state the direction in which the gas flows through the various components or stacks, otherwise relatively complex valve switching would be necessary.

Furthermore, it must be ensured that heat transition between the gas stream and heat store 20, 24 itself is sufficiently high when the heat store 20, 24 is primarily in solid form, since a poor heat transfer coefficient must be assumed here.

In order to avoid a delay in crystallization and over-saturation within the heat store, part of the storage medium should always already be in solid form at the location where crystallization is to take place, so as to function as a crystal nucleus.

Furthermore, in the spatial arrangement of the heat store, care must be taken to ensure that the entire quantity of storage material is utilized as far as possible.

The invention claimed is:

1. An electric energy store, comprising:
   a thermally insulated space which has a process gas inlet and a process gas outlet,
   at least two stacks, each stack with at least one electrochemical storage cell, being arranged in the thermally insulated space, and each stack in turn having a process gas inlet and a process gas outlet, wherein the at least two stacks are connected in series with respect to the routing of the process gas,
   a heat exchanger arranged between a first stack and a second stack of the at least two stacks, and
   a heat store disposed in the thermally insulated space and in thermal contact with the heat exchanger, and
   an inlet heat exchanger disposed in the thermally insulated space between a process gas feed and the first stack with respect to the routing of the process gas, configured to heat process gas entering the first stack, and in thermal contact with the heat store.

2. The electric energy store as claimed in claim 1, wherein the heat store is a latent heat store.

3. The electric energy store as claimed in claim 2, wherein a phase transformation temperature of a storage material of the latent heat store lies above a process gas inlet temperature and below a process gas outlet temperature.

4. The electric energy store as claimed in claim 1, wherein a heating element is arranged in the heat store.

5. The electric energy store as claimed in claim 1, further comprising:
   at least two additional stacks, each additional stack with at least one electrochemical storage cell, each additional stack being arranged in the thermally insulated space, and each additional stack in turn having a process gas inlet and a process gas outlet,
   an additional heat exchanger disposed in the thermally insulated space; and
   an additional inlet heat exchanger disposed in the thermally insulated space;
   wherein with respect to an additional routing of the process gas the at least two additional stacks are connected to each other in series, the additional heat exchanger is disposed between the at least two additional stacks, and the additional inlet heat exchanger is disposed upstream of the at least two additional stacks.

6. The electric energy store as claimed in claim 5, wherein the additional heat exchanger is in thermal contact with the heat store.

7. The electric energy store as claimed in claim 1, further comprising:
   a third stack comprising at least one electrochemical storage cell, disposed in the thermally insulated space, and connected in series with and downstream of the second stack with respect to the routing of the process gas, and
   a further heat exchanger disposed in the thermally insulated space and between the second stack and the third stack with respect to the routing of the process gas,
   wherein the inlet heat exchanger is arranged such that the inlet heat exchanger is surrounded by the heat exchanger and the further heat exchanger.

8. The electric energy store as claimed in claim 1, wherein the heat store is arranged in the thermally insulated space and is in turn insulated thermally from the thermally insulated space.

9. The electric energy store as claimed in claim 1, wherein the heat exchanger receives heat from process gas exiting one of the stacks of the at least two stacks, wherein the heat store transfers the heat to the inlet heat exchanger, and wherein the inlet heat exchanger transfers the heat to process gas entering at least one of the stacks of the at least two stacks.

10. The electric energy store as claimed in claim 1, wherein the electric energy store is embodied as a metal air battery.

* * * * *